United States Patent [19]

Andrews et al.

[11] 3,912,656

[45] Oct. 14, 1975

[54] VANADATE OXIDE AND SILANOL CATALYST SYSTEM

[75] Inventors: David Arthur Andrews, Upper Montclair, N.J.; Nathan Chadwick Hindley, Welwyn Garden City, England

[73] Assignee: Hoffmann-La Roche Inc., Nutley, N.J.

[22] Filed: Oct. 29, 1973

[21] Appl. No.: 410,930

[30] Foreign Application Priority Data

Nov. 2, 1972 United Kingdom.............. 50558/72

[52] U.S. Cl...... 252/431 R; 260/340.9; 260/397.47; 260/476; 260/488; 260/593 R; 260/601 R
[51] Int. Cl.²......................................... B01J 31/12
[58] Field of Search.. 252/431 R; 260/601 R, 593 R

[56] References Cited
UNITED STATES PATENTS

| | | | |
|---|---|---|---|
| 3,046,269 | 7/1962 | Cohen et al................. | 252/431 R X |
| 3,324,195 | 6/1967 | Hwa et al.................... | 252/431 R X |
| 3,468,865 | 9/1969 | Santiago...................... | 252/431 R X |
| 3,642,748 | 2/1972 | Iwasaki et al. ............. | 252/431 R X |

*Primary Examiner*—Patrick P. Garvin
*Attorney, Agent, or Firm*—Samuel L. Welt; Jon S. Saxe; William H. Epstein

[57] ABSTRACT

Process for converting secondary and tertiary acetylenic carbinols to the corresponding alpha,beta-unsaturated carbonyl compounds by rearranging the carbinol with (trilower alkyl-, tricycloalkyl-, triaryl- or triarylalkyl-siloxy) vanadium oxide catalyst in the presence of a silanol.

4 Claims, No Drawings

VANADATE OXIDE AND SILANOL CATALYST SYSTEM

CROSS REFERENCE TO RELATED APPLICATIONS

Related to this application is U.S. patent application Ser. No. 248,046, filed Apr. 27, 1972, Pauling.

BACKGROUND OF THE INVENTION

Certain alpha,beta-mono-unsaturated aldehydes have heretofore been obtained by the catalytic rearrangement of corresponding tertiary acetylenic carbinols or derivatives thereof. For example, acetylenic carbinols have been converted to unsaturated aldehydes by a process involving initially esterifying the carbinols and then rearranging the ester derivative with the aid of a silver or copper catalyst. Typically, such rearrangement reactions have required several process steps, including the formation of an allene ester intermediate.

In an effort to reduce the number of process steps required for such catalytic rearrangement processes, catalysts derived from a metal of the Vth or VIIth sub-group of the periodic chart, particularly vanadium, niobium, molybdenum, tungsten and rhenium, have been utilized instead of copper or silver catalysts. See British Pat. No. 1,204,754. Such catalysts have permitted acetylenic carbinols to be expeditiously rearranged to unsaturated aldehydes in a single operation. However, the use of such catalysts of the Vth to VIIth sub-group has not been found to be completely satisfactory. Considerable loss of catalyst activity has been found to inevitably occur during the course of the rearrangement reaction. In addition, it has been discovered that decomposition products are formed during the rearrangement reaction as the catalyst loses activity and that these decomposition products cause the aldehyde product to be destroyed as it is formed, thereby reducing product yields.

SUMMARY OF THE INVENTION

In accordance with this invention, a process is provided for obtaining alpha,beta-unsaturated carbonyl compounds of the formula:

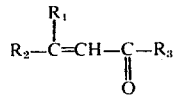

I wherein $R_1$ is individually hydrogen or lower alkyl; $R_2$ is individually hydrocarbyl, cyclohydrocarbyl or cyclohydrocarbyl substituted hydrocarbyl; $R_1$ taken together with $R_2$ and their attached carbon atom form a cyclohydrocarbyl; $R_3$ is hydrogen, hydrocarbyl, cyclohydrocarbyl or cyclohydrocarbyl substituted hydrocarbyl; said hydrocarbyl and cyclohydrocarbyl being unsubstituted or substituted in one or more positions with lower alkyl, lower alkoxy, hydroxy, oxo, ketalized oxo, lower alkanoyl, aroyl, lower alkanoyloxy, or aroyloxy; comprising rearranging an acetylenic carbinol of the formula:

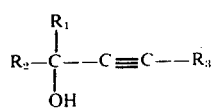

II wherein $R_1$, $R_2$ and $R_3$ are as above; in the presence of a catalyst of the formula:

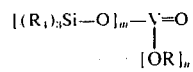

III wherein $R_4$ is lower alkyl, higher alkyl, cycloalkyl, aryl or aryl lower alkyl, said cycloalkyl or aryl being unsubstituted or substituted with lower alkyl; R is $R_4$ or $(R_4)_3Si-$; $m$ is an integer of from 1 to 3; and $n$ is an integer of from 0 to 2, with the proviso that the sum of $m$ and $n$ is 3; and a silanol of the formula:

IV wherein $R_5$ is lower alkyl, higher alkyl, cycloalkyl aryl or aryl lower alkyl, with said cycloalkyl or aryl being unsubstituted or substituted with lower alkyl.

It has been found that the use of the silanol of formula IV in the conversion of a compound of formula II to a compound of formula I such as disclosed in U.S. patent application Ser. No. 298,046, filed Apr. 27, 1972, Pauling, reduces any loss of the activity of the catalyst of formula III. Therefore, this catalyst can be reused for many subsequent reaction batches without any loss of yield of the compound of formula I produced by this process. Furthermore, the use of the silanol of formula IV in the reaction medium minimizes the production of decomposition products which would reduce the yields of the compound of formula I. Therefore, the use of the compound of formula IV in the reaction medium permits the catalyst to be reused over and over again without any deactivation or loss of yield of the compound of formula I.

Furthermore, a catalyst system is provided in accordance with this invention containing the catalyst of formula III and the silanol of formula IV. This system, which is utilized for the rearrangement of the compound of formula II can be reused, after removal of the rearrangement product, the compound of formula II, by simply adding another batch of the compound of formula II to this system.

DETAILED DESCRIPTION OF THE INVENTION

As used throughout this application, the term "hydrocarbyl" denotes a monovalent, straight chain or branched chain aliphatic substituent consisting solely of carbon and hydrogen. The hydrocarbyl group can be saturated or unsaturated in one or more positions. Among the hydrocarbyl groups are included alkyl groups containing from 1 to 30 carbon atoms and alkenyl and alkynyl groups containing from 2 to 30 carbon atoms. The alkyl groups can be unsubstituted or substituted in one or more positions with lower alkyl, lower alkoxy, hydroxy, oxo, ketalized oxo, lower alkanoyl, aroyl, lower alkanoyloxy, or aroyloxy groups. Among the preferred hydrocarbyl groups are included lower alkyls and groups having an isoprene or isoprene-like structure. Among the preferred substituted or unsubstituted hydrocarbyl groups denoted by $R_2$ and $R_3$ are included:

methyl;
4-methyl-pent-3-enyl;
3,4-dimethyl-pent-3-enyl;
1-ethyl-4-methyl-pent-3-enyl;
4-hydroxy-4-methyl-pentyl;
4-methoxy-4-methyl-pentyl;
4,8-dimethyl-nona-3,7-dienyl;
4,8,12-trimethyl-tridecyl; and
4,8,12-trimethyl-trideca-3,7,11-trienyl.

As also used throughout this application, the term "cyclohydrocarbyl" denotes a monovalent, mono-or poly-cycloaliphatic or aryl substituent consisting solely of carbon and hydrogen. The cycloaliphatic group can be saturated or unsaturated in one or more positions. The cyclohydrocarbyl substituent defined by $R_1$, $R_2$ and $R_3$ can be unsubstituted or substituted in one or more positions with lower alkyl, lower alkoxy, hydroxy, oxo, ketalized oxo, lower alkanoyl, aroyl, lower alkanoyloxy or aroyloxy groups. The substituted and unsubstituted cyclohydrocarbyl can include from 3 to 30 carbon atoms. Among the preferred monocycloaliphatic substituents which are defined by $R_1$, $R_2$ and $R_3$ are included the cycloalkyl or cycloalkenyl groups containing from 3 to 10 carbon atoms, i.e., cyclohexyl, cyclopropyl, cycloheptyl, 3-methyl-cyclohex-3-en-1-yl; and 4-methyl-cyclohex-3-en-1-yl and cyclohexenyl. Among the preferred aryl substituents which are defined by $R_1$, $R_2$ and $R_3$ being cyclohydrocarbyl is phenyl and naphthyl. In the compounds of formula II where $R_1$ and $R_2$ are joined together to form an unsubstituted or substituted monocycloaliphatic substituent, the preferred compounds are:

1-ethynyl-cyclopentanol;
1-ethynyl-cyclohexanol;
1-ethynyl-2,6,6-trimethyl-cyclohexanol;
4-ethynyl-4-hydroxy-1-oxo-3,5,5-trimethyl-cyclohex-2-ene; and
4-ethynyl-4-hydroxy-1,1-ethylenedioxy-3,5,5-trimethyl-cyclohex-2-ene.

The term "cyclohydrocarbyl" also includes polycycloaliphatic substituents, i.e., a cycloalkyl group condensed with one or more saturated or unsaturated cycloalkyl groups. Where $R_1$ and $R_2$ taken together with their attached carbon atom form a cyclohydrocarbyl substituent, the substituent can be a monocycloaliphatic group or a monocycloaliphatic group condensed with one or more cyclohydrocarbyl groups. These groups include:

17alpha-ethynyl-3beta,17beta-dihydroxy-androst-5-ene;
17alpha-ethynyl-17beta-hydroxy-13beta-methyl-gon-5(10)-en-3-one; and
norgestrel.

As further used throughout this application, the term "cyclohydrocarbyl substituted hydrocarbyl" denotes cyclohydrocarbyl substituted hydrocarbyl groups wherein cyclohydrocarbyl and hydrocarbyl are defined as above. Both the cyclohydrocarbyl and hydrocarbyl groups can be unsubstituted or either one or both of the hydrocarbyl and cyclohydrocarbly groups can be substituted in one or more positions with lower alkyl, lower alkoxy, hydroxy, oxo, ketalized oxo, lower alkanoyl, aroyl, lower alkanoyloxy or aroyloxy.

Among the preferred cyclohydrocarbyl substituted hydrocarbyl substituents defined by $R_2$ and $R_3$ are the groups wherein the hydrocarbyl moiety has an isoprene or isoprene-like structure, such as:

2-(2,6,6-trimethyl-cyclohex-1-en-1-yl)-vinyl;
2-(4-oxo-2,6,6-trimethyl-cyclohex-1-en-1-yl)-vinyl;
2-(4,4-ethylenedioxy-2,6,6-trimethyl-cyclohex-1-en-1-yl)-vinyl;
6-(2,6,6-trimethyl-cyclohex-1-en-1-yl)-4-methyl-hexan-1,3,5-trienyl;
6-(4-oxo-2,6,6-trimethyl-cyclohex-1-en-1-yl)-4-methyl-hex-1,3,5-trienyl; and
6-(4,4-ethylenedioxy-2,6,6-trimethyl-cyclohex-1-en-1-yl)-4-methyl-hexa-1,3,5-trienyl groups.

Among the substituted and unsubstituted hydrocarbyl groups defined by $R_3$ are:

propyl;
2-hydroxy-prop-2-yl; and
2,6-dimethyl-hepta-1,3,5-trienyl.

As further used throughout this application, the term "lower alkyl" comprehends branched chain and straight chain, saturated aliphatic hydrocarbyl groups containing 1 to 7 carbon atoms, such as methyl, ethyl, propyl and isopropyl. As also used herein, the term "lower alkoxy" comprehends lower alkyloxy groups containing 1 to 7 carbon atoms such as methoxy and isopropoxy. As further used herein, the term "lower alkanoyl" comprehends lower alkyl acyl groups containing 1 to 7 carbon atoms such as formyl, acetyl, propionyl, and butyryl. As still further used herein, the term "aroyl" comprehends monocyclic, aromatic hydrocarbon acyl groups which may be unsubstituted or substituted in one or more positions with lower alkyl.

The preferred aroyl is benzoyl. Also herein, the term "lower alkanoyloxy" comprehends lower alkyl acyloxy groups containing 2 to 7 carbon atoms such as acetoxy and propionyloxy. Further herein, the "aroyloxy" comprehends groups such as benzoyloxy. Still further herein, the term "cycloalkyl" comprehends cycloaliphatic groups of 3 to 7 carbon atoms, such as cyclohexyl. Also herein, the term "aryl" signifies mono nuclear aromatic hydrocarbon groups such as phenyl, tolyl, etc., which can be unsubstituted or substituted in one or more positions with lower alkyl, or polynuclear aryl groups such as naphthyl, anthryl, phenanthryl, azulyl, etc., which can be unsubstituted or substituted with one or more of the aforementioned groups. The preferred aryl substituents are phenyl or naphthyl which can be unsubstituted or substituted in one or more positions with lower alkyl.

In the compound of formula III,

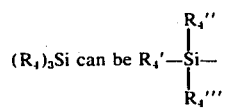

wherein $R_4'$, $R_4''$ and $R_4'''$ have the same meaning as $R_4$; and in the compound of formula IV

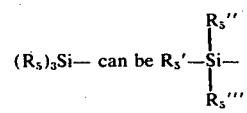

wherein $R_5'$, $R_5''$ and $R_5'''$ have the same meaning as $R_5$.

As still further used throughout this application, the term "aliphatic", with reference to a hydrocarbyl or cyclohydrocarbyl group, denotes substituents containing no aromatic unsaturation but which can be otherwise saturated or unsaturated, i.e., an alkyl or a group containing olefinic and/or acetylenic unsaturation. Also herein, the term "ketalized oxo" comprehends derivatives of an oxo group formed by reaction thereof with a lower alkanediol, preferably ethylene glycol, or a lower alkanol, preferably methanol, to yield a lower alkylenedioxy group. The preferred lower alkylenedioxy groups are the groups having 1 to 4 carbon atoms, particularly methylenedioxy and ethylenedioxy.

The group designated by $R_4$ in the compound of formulae III and IV is preferably a lower alkyl group containing from 1 to 7 carbon atoms, i.e., methyl, ethyl, isopropyl or n-butyl; a phenyl or naphthyl group which can be unsubstituted or substituted in one or more positions with lower alkyl (tolyl or xylyl). Furthermore, $R_4$ can be a phenyl lower alkyl group such as benzyl or phenethyl or a higher alkyl group containing from 8 to 20 carbon atoms such as decyl, dodecyl, octyl, pentadecyl, octadecyl, etc.

Among the important alpha,beta-unsaturated carbonyl compounds of formula I are included compounds of the formula:

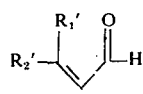     IA wherein $R_1'$ and $R_2'$ are taken together with their attached carbon atom to form an unsubstituted cycloaliphatic substituent or substituted with lower alkyl, lower alkoxy, hydroxy, oxo or ketalized oxo; compounds of the formula:

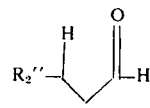     IB wherein $R_2''$ is unsubstituted cyclohydrocarbyl or cyclohydrocarbyl substituted with lower alkyl, lower alkoxy, hydroxy, oxo or ketalized oxo; unsubstituted and hydroxy and alkoxy substituted compounds of the formula:

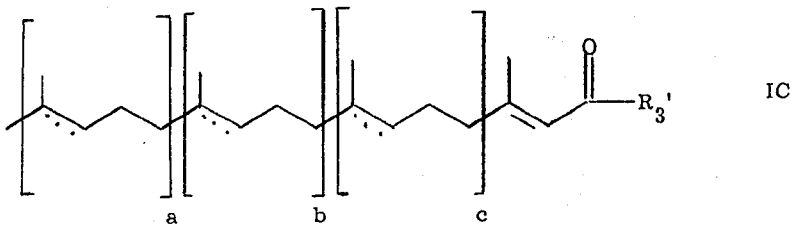     IC wherein $R_3'$ is hydrogen or lower alkyl; $a = 1, b = 1$ and $c = 1$ or $a = 0, b = 1$ and $c = 1$ or $a = 0, b = 0$ and $c = 1$ or $a = 0, b = 0$ and $c = 0$; and the dotted bonds can be optionally hydrogenated and wherein hydroxy and lower alkoxy substituents may be present in the groupings $a$, $b$ and $c$; compounds of the formula:

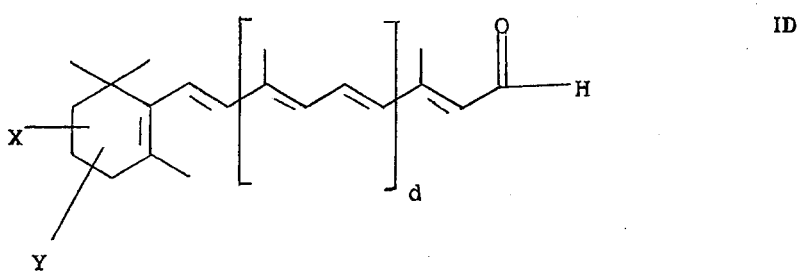     ID wherein $d$ is an integer of 0 to 1; X is hydroxy or hydrogen; and Y is oxo or hydrogen; and compounds of the formula:

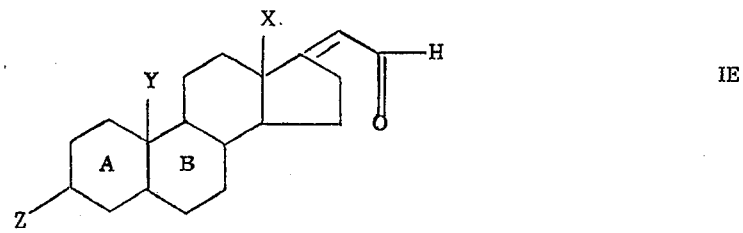     IE wherein X is lower alkyl; Y is hydrogen or lower alkyl; Z is hydroxy, oxo, ethoxy or acyloxy, and wherein the A-ring can be saturated or wholly or partially unsaturated and the B-ring can be saturated or partially unsaturated.

The acetylenic carbinols of formula II utilized as starting materials in the process of this invention for conversion to the preferred carbonyl compounds of formulae IA, IB, IC, ID and IE hereinbefore, are compounds of the formula

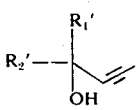 IIA wherein $R_1'$ and $R_2'$ are as above;

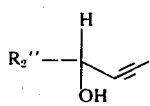 IIB wherein $R_2''$ is as above;

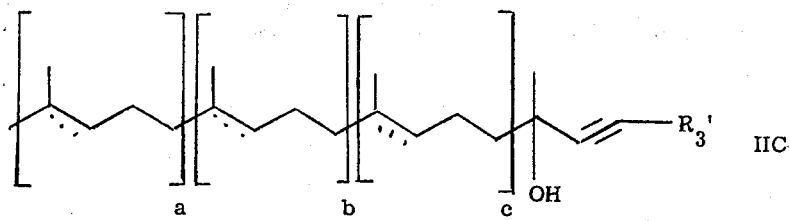 IIC wherein $R_3'$, a, b, c and the dotted bonds are as above; and wherein hydroxy and lower alkoxy substituents may be present in the groupings a, b and c;

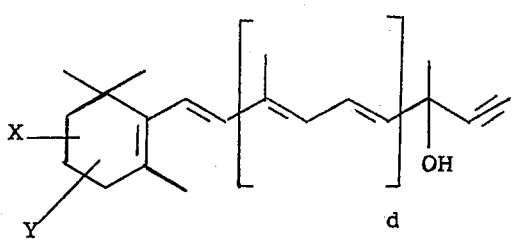 IID wherein Y, X and d are as above; and

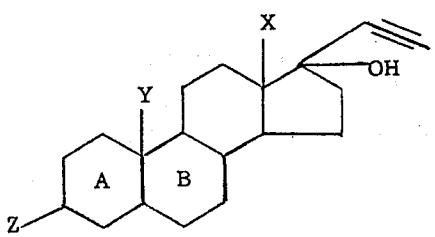 IIE wherein X, Y and Z are as above; and the A-ring can be saturated or wholly or partially unsaturated and the B-ring can be saturated or partially unsaturated.

The process of the present invention has proved to be particularly favorable and advantageous for the manufacture of the following oxo compounds:
Senecioaldehyde (prenal);
3-methyl-pent-2-en-1-al;
3,7-dimethyl-4-ethyl-octa-2,6-dien-1-al;
3,7-dimethyl-7-methoxy-oct-2-en-1-al;
non-2-en-1-al;
citral;
7-hydroxy citral(7-hydroxy-3,7-dimethyl-oct-6-en-1-al);
alpha-citral(3,7-dimethyl-oct-7-en-1-al);
farnesal;
phytal;
cyclohexylidene-acetaldehyde;
2,6,6-trimethyl-cyclohexylidene-acetaldehyde;
cinnamaldehyde;
beta-$C_{15}$-aldehyde;
vitamin A aldehyde;
2-methyl-hept-2-en-4-one;
2,5-dimethyl-hex-2-en-5-ol-4-one;
17-formylmethylene-3beta-hydroxy-androst-5-ene;
17-formylmethylene-13beta-methyl-gon-5(10)-en-3-one; and
13beta-ethyl-17-formylmethylene-gon-4-en-3-one.

Of the catalysts of formula III employed in accordance with the present invention, those of the general formula:

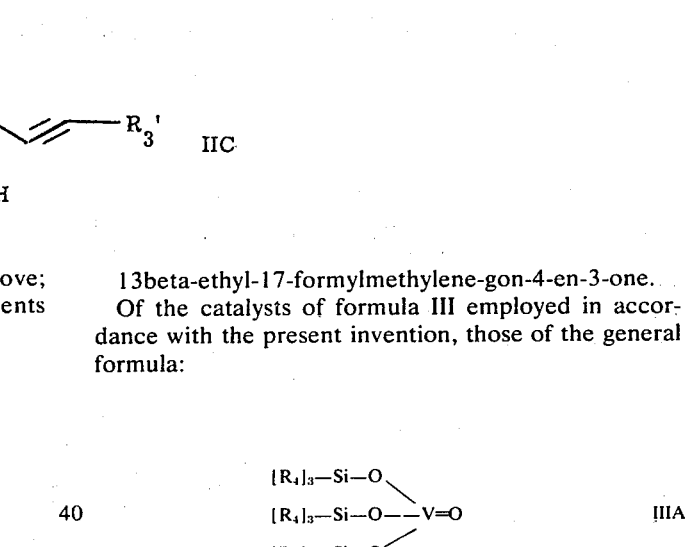 IIIA wherein $R_4$ is as above; occupy a preferred position. In an especially preferred aspect, $R_4$ is an alkyl or phenyl group. Particular examples of catalysts of formula IIIA are:
tris-(trimethyl-siloxy)-vanadium oxide; and
tris-(triphenyl-siloxy)-vanadium oxide.
tris-(tricyclohexyl-siloxy)-vanadium oxide.

The catalysts of formulae III and IIIA are known compounds. They can be prepared according to methods known per se; for example, by i. the reaction of, for example, vanadium pentoixde with, for example, a trialkyl silanol of the formula (alkyl)$_3$SiOH or a triaryl silanol of the formula (aryl)$_3$SiOH or a tricycloalkyl silanol with azeotropic removal of the water formed in the reaction with the aid of an extraining agent such as, for example, benzene.

ii. the reaction of, for example, vanadium oxytrichloride with, for example, a trialkyl silanol or triaryl silanol or tricycloalkyl silanol in the presence of a base such as pyridine or ammonia;

iii. the reaction of, for example, vanadium oxytrichloride with, for example, a trialkyl alkali silanolate of the formula (alkyl)$_3$SiOMe(I) or a triaryl alkali silanolate of the formula (aryl)$_3$SiOMe(I), wherein Me indicates an alkali metal.

iv. The reaction of, for example, a vanadium acid ester of the formula (alkoxy)$_3$—V=O with, for example, a trialkyl silanol or triaryl silanol or tri(cycloalkyl)-silanol in the presence of catalytic amounts of an alkyl-, aryl- or cycloalkyl alkali silanolate (e.g., a trialkyl alkali silanolate).

v. the reaction of, for example, silver orthovanadate of the formula Ag$_3$VO$_4$ with, for example, a trialkyl silyl halide of the formula (alkyl)$_3$SiCl or a triaryl silyl halide of the formula (aryl)$_3$SiCl in a solvent such as, for example, benzene or methylene chloride;

vi. the reaction of, for example, vanadium pentoxide with, for example, a hexaalkyl disiloxane of the formula (alkyl)$_3$SiOSi(alkyl)$_3$ at an elevated temperature, for example at about 100°C.; or vii. the double reaction of a vanadium acid ester of the formula (alkoxy)$_3$—V=O with a trialkyl silyl ester or triaryl silyl ester, for example, of tripropyl orthovanadate with trimethyl silyl acetate with the expulsion of propyl acetate.

The catalyst system used in the isomerization reaction can be prepared by mixing the silanol of formula IV and the vanadate catalyst of formula III. This mixture which is utilized to isomerize the compound of formula II contains at least 0.05 mole percent of the silanol of formula IV based upon the moles of the vanadate catalyst of formula III in the mixture. The mixture utilized to isomerize the compound of formula II can contain a large excess of silanol, i.e., 85,000 mole percent or greater of the silanol of formula IV, based upon the mole percent of the vanadate catalyst of formula III. Generally, it is preferred that the mixture contain from about 5 mole percent to 65,000 mole percent of the silanol of formula IV, based upon the moles of the vanadate catalyst contained in the mixture. Mixtures containing from 25 mole percent to 8,500 mole percent of the silanol of formula IV based on the moles of the vanadate of formula III are especially preferred. The compound of formula II can be added to the mixture or the mixture can be added to the compound of formula II in order to carry out the isomerization reaction.

The catalytic isomerization of acetylenic carbinols of formula II to alpha,beta-unsaturated oxo compounds of formula I in accordance with the present invention is expediently carried out by reacting the corresponding carbinol together with the catalyst system containing the vanadate catalyst and slanol of formula IV. The catalytic isomerization is expediently carried out using about 0.1 to about 20 mole percent, preferably about 1.5 to about 2 mole percent of catalyst of formula III based on the moles of the compound of formula II.

The silanol of formula IV is present in the reaction mixture in an amount of about 0.01 mole percent based upon the moles of the compound of formula II up to an amount in which it takes on the function of a solvent. An addition of 1-85 mole percent, especially 5–65 mole percent of silanol is preferred. The mole percent of silanol is based on the moles of the compound of formula II.

The siloxy moiety of the silanol of formula IV need not be identical with the siloxy moiety of the catalyst of formula III. When a silanol and catalyst having different siloxy moieties are used there is generally formed the most stable compound from the thermodynamic point of view. Thus, for example, tris-[tri(n-propyl)-siloxy]-vanadium oxide is converted into tris-(triphenyl-siloxy)-vanadium oxide by the addition of triphenyl silanol.

The present catalytic isomerization can be carried out in an inert solvent and in the presence of, or with the exclusion of air. As the solvent, any conventional inert organic solvent can be utilized. Suitable solvents are, for example, aliphatic hydrocarbons such as, for example, heptane, cyclohexane, cyclododecane, decalin, paraffin and paraffin oil, aromatic hydrocarbons such as, for example, benzene, nitrobenzene, toluene and xylene, halogenated hydrocarbons such as, for example, chlorobenzene, ethers such as, for example, anisole or dioxane or amines. Polymeric silicon-containing solvents such as silicon oils containing aliphatic or aromatic groups (e.g., methyl phenyl polysiloxane) can also be used. As mentioned earlier, a silanol of formula IV can be added to the mixture in an excess amount and can thus also serve as a solvent. Therefore, any excess of the silanol of formula IV can be utilized in carrying out this reaction.

In carrying out this rearrangement reaction, temperature and pressure are not critical, and this reaction can be suitably carried out at a temperature of between about room temperature (22°C.) and the boiling point of the reaction mixture and at atmospheric pressure. Preferably, the reaction is carried out at a temperature between 50°C. and 200°C., with a temperature of about 100°C. to 160°C. being particularly preferred. If desired, the isomerization can also be carried out under pressure, in which case pressures of from 1 atmosphere to about 50 atmospheres can be used. Also, the isomerization time can vary within wide ranges. In general, it amounts to about 2–20 hours. If desired, reaction times of 120 hours or longer can be utilized without deleteriously affecting this reaction. However, since there is no additional beneficial results from prolonged heating, the use of long reaction times only adds additional expense to carrying out the reaction. The catalyst system containing siloxy vanadium oxide catalyst and silanol employed in the present isomerization retains practically its complete activity during the isomerization. It can therefore be used again for carrying out many (ca 100–200) isomerization batches.

The isomerization product is separated from the unreacted portions of the carbinol starting material in the usual manner; for example, by rectification. The unreacted carbinol portions can again be employed in the next batch. With this procedure there are obtained, in general, conversions of 70 to 99.9%, and, depending on the carbinol starting material employed, yields of more than 90%.

The following examples are illustrative but not limitative of the invention. All temperatures are in degrees centrigrade. The name dehydrolinalool designates the compound 3,7-dimethyl-oct-6-en-1-yn3-ol.

EXAMPLE 1

15.2 g of dehydrolinalool, 1.3 g of tris-[triphenyl-siloxyl]-vanadium oxide, 5.5 g of triphenyl silanol and 100.0 ml of high-boiling paraffin oil [$D_{20}^4 = 0.885$] are heated to 140°C. in a nitrogen atmosphere for about 4 hours. The mixture is subsequently cooled to 70°C. and, at this temperature, subjected firstly to a simple distillation and thereafter to a vacuum distillation [0.1 mmHg]. In the last 30 minutes of the distillation the temperature is increased to 140°C. so that all liquid components distill over. The residual catalyst/paraffin oil mixture can again be employed, as mentioned earlier, for the isomerization of further 15.2 g batches of dehydrolinalool. The results of 10 isomerizations carried out with the same catalyst are given in the following Table:

Table

Isomerization of dehydrolinalool [DLL-OH] to citral with the aid of tris-[triphenyl-siloxy]-vanadium oxide

| Batch | | % conversion of DLL-OH | % yield of citral |
|---|---|---|---|
| 1 | 4 hours | 95.9 | 97.2 |
| 2 | 4 hours | 97.6 | 99.6 |
| 3 | 4 hours | 97.5 | 97.5 |
| 4 | 3 hours 45 minutes | 97.1 | 95.3 |
| 5 | 3 hours 45 minutes | 96.3 | 99.2 |
| 6 | 3 hours 30 minutes | 96.2 | 98.7 |
| 7 | 3 hours 30 minutes | 96.5 | 98.3 |
| 8 | 3 hours 30 minutes | 95.2 | 97.7 |
| 9 | 3 hours 30 minutes | 95.7 | 96.2 |
| 10 | 3 hours 30 minutes | 95.2 | 98.5 |

EXAMPLE 2

124.5 g of pyridine are dissolved in 1350 ml of benzene. A solution of 82.5 g of vanadium oxychloride in 1350 ml of benzene and a solution of 414.6 g of triphenyl silanol in 4500 ml of benzene are simultaneously introduced with stirring into the resulting solution in the course of 2.5 hours. In so doing, the temperature rises from 21°C. to about 31°C. The mixture is stirred for a further 3 hours without cooling. The precipitated pyridine hydrochloride is filtered off. The filtrate is concentrated. The crystal-mass obtained is taken up in 3000 ml of diethyl ether. The tris-[triphenyl-siloxy]-vanadium oxide which separates out in crystalline form is filtered off, washed with diethyl ether and dried in a vacuum at 40°C.–50°C. Melting point 224°226°C.

EXAMPLE 3

By the procedure of Example 2 there can be prepared, inter alia:

from vanadium oxychloride and trimethyl silanol the tris-[trimethyl-siloxy]-vanadium oxide
  b.p.: 103°–105°C/10 mmHg.
from vanadium oxychloride and ethyl dimethyl silanol the tris-[ethyl-dimethyl-siloxy]-vanadium oxide
  b.p.: 124°–126°C/7 mmHg.
from vanadium oxychloride and diethyl methyl silanol the tris-[diethyl-methyl-siloxy]-vanadium oxide
  b.p.: 169°–170°C/5 mmHg.
from vanadium oxychloride and triethyl silanol the tris-[triethyl-siloxy]-vanadium oxide
  b.p.: 198°–201°C/12 mmHg.
from vanadium oxychloride and tri(n-butyl) silanol the tris-[tri(n-butyl)-siloxy]-vanadium oxide
  b.p.: 59°–60°C/0.1 mmHg.
from vanadium oxychloride and phenyl diethyl silanol the tris-[phenyl-diethyl-siloxy]-vanadium oxide
  b.p.: 263°–264°C/1 mmHg.
from vanadium oxychloride and diphenyl methyl silanol the tris-[diphenyl-methyl-siloxy]-vanadium oxide
from vanadium oxychloride and a mixture of 2 parts of trimethyl silanol and 1 part of isopropanol the bis-[trimethyl-siloxy]-isopropoxy-vanadium oxide
  b.p.: 63°–67°C/1 mmHg.
from vanadium oxychloride and a mixture of 1 part of trimethyl silanol and 2 parts of isopropanol the [-trimethyl-siloxy]-bis-(isopropoxy)-vanadium oxide
  b.p.: 73°–74°C/3 mmHg.

EXAMPLE 4

462 ml of paraffin oil [$D_{20}^4 = 0.855$], 15.2 g of triphenyl silanol and 31.3 g of dehydrolinalool are mixed together with stirring and heated to 140°C. in an atmosphere of air or in an inert gas atmosphere. The clear, light-yellow colored solution which results after the addition of 4.3 g of tris- triphenyl-siloxy-vanadium oxide is stirred at 140°–142°C. for 4 hours. The mixture is thereafter cooled to about 80°C. and distilled under reduced pressure [0.1–0.5 mmHg]. The citral which passes over at 50°–60°C.,<1 mmHg, is distilled off completely. The temperature is thereby raised to about 140°C. for about 15 minutes towards the end of the distillation.

After the removal of the citral, a new isomerization batch can be proceessed immediately by treating the residual paraffin oil/catalyst mixture at 140°C. with 31.3 g of dehydrolinalool as previously described. The results thereby obtained are given in the following Table:

Table

| Batch | Conversion | Citral Yield |
|---|---|---|
| No. | % | % |
| 1 | 98.3 | 97.1 |
| 3 | 99 | 96.6 |
| 8 | 98.7 | 95.7 |
| 12 | 99.4 | 91.8 |
| 15 | 99.5 | 87.3 |
| 18 | 98.4 | 90.9 |
| 30 | 97.8 | 90.5 |
| 50 | 96 | 77.3 |
| 60 | 93.4 | 81.4 |
| 70 | 88 | 76.5 |

EXAMPLE 5

120 g of 3-methyl-but-1-yn-3-ol and 80 g of triphenyl silanol are heated to 140°C. for 7 hours in 2800 ml of paraffin oil [$D_{20} = 0.885$] and the mixture is treated at this temperature with 40 g of tris-[triphenyl-siloxy]-vanadium oxide. The mixture is cooled to about 78°C. and distilled under reduced pressure, the pressure being lowered to 5 mmHg towards the end of the distillation. The prenal [3-methyl-but-2-en-1-al] which is formed boils at 132°–133°C/730 mmHg.

The residual mixture, consisting of the paraffin oil employed and the tris-[triphenyl-siloxy]-vanadium oxide and triphenyl silanol can again be employed for the isomerization of further 120 g batches of 3-methyl-but-1-yn-3-ol. The results obtained in this series of experiments are given in the following Table:

Table

| Batch | Conversion | Yield Prenal |
|---|---|---|
| No. | % | % |
| 1 | 99.1 | 97 |
| 2 | 100 | 95.9 |
| 3 | 98.6 | 98.1 |
| 4 | 100 | 97.7 |
| 5 | 99 | 98.4 |
| 6 | 100 | 93.1 |
| 7 | 98.7 | 98.1 |
| 8 | 100 | 90.8 |
| 9 | 98.4 | 92.4 |
| 10 | 100 | 91.4 |
| 11 | 99.9 | 88.7 |
| 12 | 99.8 | 94.3 |
| 16 | 98.1 | 82.2 |

EXAMPLE 6

The following isomerizations can be carried out by the procedure described in Example 4.

| | | Yield |
|---|---|---|
| — | 3-methyl-pent-1-yn-3-ol | |
| to | 3-methyl-pent-2-en-1-al | |
| | b.p.: 60°C./35 mmHg. | 87% |
| — | 3,6,7-trimethyl-oct-6-en-1-yn-3-ol | |
| to | 3,6,7-trimethyl-oct-2,6-dien-1-al | |
| | b.p.: 69°C./0.3 mmHg. | 89.2% |
| — | 3,7-dimethyl-4-ethyl-oct-6-en-1-yn-3-ol | |
| to | 3,7-dimethyl-4-ethyl-oct-2,6-dien-1-al | |
| | b.p.: 72°C./0.4 mmHg. | 80.1% |
| — | 3-[(4or3)-methyl-cyclohex-3-en-1-yl]-but-1-yn-3-ol | |
| to | 3-[(4or3)-methyl-cyclohex-3-en-1-yl]-but-2-en-1-al | |
| | b.p.: 60°c./0.3 mmHg. | 85.5% |
| — | 3,7-dimethyl-7-methoxy-oct-1-yn-3-ol | |
| to | 3,7-dimethyl-7-methoxy-oct-2-en-1-al | |
| | b.p.: 66°C./0.1 mmHg. | 87.8% |
| — | 2,6-dimethyl-oct-7-yn-2,6-diol [7-hydroxydehydrolinalool] | |
| to | 3,7-dimethyl-oct-2-en-7-ol-1-al [7-hydroxycitral] | |
| | b.p.: 98°C./0.3 mmHg. | 55% |
| — | 1-ethynyl-cyclohexanol | |
| to | a) cyclohexylidene-acetaldehyde b.p.: 48°C./1.3 mmHg. | 52% |
| and | b) cyclohex-1-en-1-yl-acetaldehyde b.p.: 48°C./1.3 mmHg. | 8.6% |
| — | 1-ethynyl-2,6,6-trimethyl-cyclohexanol | |
| to | a) 2,2,6-trimethyl-cyclohexylidene-acetaldehyde b.p.: 59°C./0.6 mmHg. | 43.2% |
| and | b) 2,2,6-trimethyl-cyclohex-1-en-1-yl-acetaldehyde b.p.: 50°c./0.1 mmhg. | 43.2% |
| — | 1-ethynyl-cyclopentanol | |
| to | cyclopentylidene-acetaldehyde b.p.: 30°C./0.1 mmHg. | 28.8% |
| — | non-1-yn-3-ol | |
| to | non-2-en-1-al b.p.: 34°C./0.25 mmHg. | 45% |
| — | 2,5-dimethyl-hex-3-yn-2,5-diol | |
| to | 2,5-dimethyl-hex-2-en-5-ol-4-one b.p.: 35°C./0.2 mmHg. | 89% |
| — | 3,7,11-trimethyl-dodeca-6,10-dien-1-yn-3-ol [dehydronerolidol] | |
| to | 3,7,11-trimethyl-dodeca-2,6,10-trien-1-al [farnesal] b.p.: 86°C./0.2 mmHg. | 85% |
| — | 3,7,11,15-tetramethyl-hexadeca-6,10,14-trien-1-yn-3-ol [dehydrogeranyllinalool] | |
| to | 3,7,11,15-tetramethyl-hexadeca-2,6,10,14-tetraen-1-al [geranylcitral] b.p.: 135°C./0.2 mmHg. | 63% |
| — | 3,7,11,15-tetramethyl-hexadec-1-yn-3-ol [dehydroisophytol] | |
| to | 3,7,11,15-tetramethyl-hexadec-2-en-1-al [phytal] b.p.: 150°C./0.3 mmHg. | 80% |

EXAMPLE 7

A mixture of 15.2 g of 3-hydroxy-3,7-dimethyl-octa-6-en-1-yne [dehydrolinalool], 0.52 g of tris-[trimethyl-siloxy]-vanadium oxide, 5.5 g of triphenyl silanol and 200 g of liquid paraffin (b.p.<170°C/0.1 mmHg) are heated to 140°C. under an inert gas atmosphere for 4 hours. The citral formed is separated from the unreacted dehydrolinalool by rectification. The conversion of dehydrolinalool amounts to 92%. The yield of citral based on reacted dehydrolinalool amounts to 97.2%.

The same catalyst can be employed in over 100 isomerization cycles for the conversion of dehydrolinalool into citral in similar high yields.

EXAMPLE 8

15.2 g of dehydrolinalool, 0.6 g of tris-[dimethyl-ethyl-siloxy]-vanadium oxide and 2.2 g of tricyclohexyl silanol are heated to 140°C. for 6 hours in 300 ml of silicon oil. The conversion of dehydrolinalool amounts to 85%. The yield of citral based on reacted dehydrolinalool amounts to 90.7%

After distilling off the liquid constituents, the isomerization to citral can be repeated numerous times after renewed addition of dehydrolinalool batches.

EXAMPLE 9

15.2 g of dehydrolinalool, 1.06 g of bis-[triphenyl-siloxy]-[trimethyl-siloxy]-vanadium oxide, 4.8 g of tri(p-tolyl) silanol and 180 ml of high-boiling paraffin oil [$D_{20}^4 = 0.885$] are heated to 150°C. for 3 hours with stirring. The conversion of dehydrolinalool employed amounts to 96.8%. The yield of citral based on reacted dehydrolinalool amounts to 96%.

The same catalyst can be used for many further isomerizations.

EXAMPLE 10

5.2 g of dehydrolinalool, 1.5 g of bis-[trimethyl-siloxy]-[triphenyl-siloxy]-vanadium oxide, 4.5 g of tri(m-tolyl) silanol and 200 ml of high-boiling paraffin oil [$D_{20}^4 = 0.885$] are heated to 145°C. for 2.5 hours. The conversion of dehydrolinalool employed amounts to 92%. The yield of citral based on reacted dehydrolinalool amounts to 93%.

EXAMPLE 11

15.2 g of dehydrolinalool, 1 g of bis-[triphenyl-siloxy]-isopropoxy-vanadium oxide, 1.8 g of dicyclohexyl methyl silanol and 90 ml of high-boiling paraffin oil [$D_{20}^4 = 0.885$] are heated to 140°C. for 7.5 hours with the exclusion of moisture. The conversion of dehydrolinalool employed amounts to 81.7%. The yield of citral based on reacted dehydrolinalool amounts to 89%.

EXAMPLE 12

15.2 g of dehydrolinalool, 0.92 g of [triphenyl-siloxy]-bis(isopropoxy)-vanadium oxide, 4.3 g of tri(1-naphthyl) silanol and 170 ml of silicon oil are heated to 125°C. for 6 hours. The conversion of dehydrolinalool amounts to 85%. The yield of citral based on reacted dehydrolinalool amounts to 90%.

EXAMPLE 13

13.2 g of 3-hydroxy-3-phenyl-prop-1-yne, 2 g of tris-[triphenyl-siloxy]-vanadium oxide, 4.15 g of triphenyl silanol and 100 ml of silicon oil are heated to 140°C. for 6 hours with the exclusion of moisture. The conversion of the acetylenic carbinol employed amounts to 94%. The yield of cinnamaldehyde amounts to 95.1%.

EXAMPLE 14

12.6 g of 2-hydroxy-2-methyl-hept-3-yne, 0.7 g of tris-[trimethyl-siloxy]-vanadium oxide, 2.6 g of tri(n-pentyl) silanol and 150 ml of high-boiling paraffin oil [$D_{20}^4 = 0.885$] are heated at 130°C. for 5 hours with the exclusion of moisture. The conversion of the acetylenic alcohol employed amounts to 94.5%. The yield of 2-methyl-hept-2-en-4-one amounts to 97.5%.

EXAMPLE 15

10 g of 4-ethynyl-4-hydroxy-1,1-ethylenedioxy-3,5,5-trimethyl-cyclohex-2-en, 0.15 g of hydroquinone, 0.02 ml of tris-[trimethyl-siloxy]-vanadium oxide, 1.75 g of tri(n-propyl) silanol and 100 ml of dry mesitylene are heated to boiling for 16 hours under reflux conditions and with the exclusion of moisture. The solvent and the excess silanol are distilled off under reduced pressure. The residual isomer mixture of cis/trans (4,4-ethylenedioxy-2,6,6-trimethyl-cyclohex-2-en-1-yidene)-acetaldehyde boils at 110°–125°C/0.1 mmHg after rectification in high vacuum. The conversion of the acetylenic carbinol employed amounts to 88%. The aldehyde is obtained in a yield of 92%.

EXAMPLE 16

Tris-(triphenyl-siloxy)vanadium oxide (5 g.), triphenylsilanol (10 g.), stearic acid (0.5 g.), and mineral oil (400 ml,) were heated to 150°C. under nitrogen and 3,7-dimethyl-7-octen-1-yn-3-ol (15 g.) was added. After 1.5 hours at 150°C., the product was distilled under a reduced pressure of less than 1 mmHg. More 3,7-dimethyl-7-octen-1-yn-3-ol (15 g.) was added to the reaction mixture under atmospheric pressure and the product was distilled as before after reaction at 150°C. for 1.5 hours. The combined distillates of 3,7-dimethyl-2,7-octadienal (29.3 g.) contained no detectable quantity of the isomer 3,7-dimethyl-2,6-octadienal.

EXAMPLE 17

3-Keto-androsta-4,17(20)-dien-20-carboxaldehyde

A solution of 1.01 g of 17α-ethynyl-androst-4-en-17β-ol-3-one, 0.103 g. of tris-(triphenyl-siloxy) vanadium oxide 0.029 g of triphenylsilanol, and 0.01 g. of benzoic acid in 20 ml of xylene was refluxed for 4 hours. The solution was cooled, diluted with hexane and filtered. The filtrate was washed with 10% sodium bicarbonate, and the wash re-extracted with ethyl acetate. The combined organic solutions were dried over anhydrous sodium sulfate and concentrated to give 1.20 g. of a yellow oil. Chromatography of the crude product on activity III alumina afforded 0.802 g. of a colorless crystalline solid, m.p. 110°–116°C.

UV in ethanol, $\lambda_{max} = 242$ m$\mu$ ($\epsilon = 33,300$).
Ir (KBr), $\nu_{max} = 1660, 1595$ cm$^{-1}$.
Recrystallization from methanol-water gave an analytical sample, m.p. 134°–136°C.

Anal.: calcd for $C_{21}H_{28}O_2$; C80.73, H9.03 found C80.92, H9.02

EXAMPLE 18

3-Methoxy-estra-1,3,5(10),17(20)-tetraene-20-carboxaldehyde 1.04 g. of mestranol (17α-ethynyl-3-methoxy-estra-1,3,5(10), trien-17β-ol), 0.06 ml. of tris-(trimethyl-siloxy)vanadium oxide 414 mg. of tri-phenylsilanol, 0.025 g. of benzoic acid, and 20 ml. of xylene were refluxed for 4 hours. The solution was cooled, diluted with hexane, filtered and concentrated to give 0.924 g. of crude product. Dissolution of the crude oil in hexane and cooling deposited 0.796 g. of yellow crystals, m.p. 140°–150°C. Recrystallization from isopropanol gave 0.515 g. of light yellow crystals, m.p. 141°–155°C.

UV in ethanol, $\lambda_{max} = 234$ ($\epsilon = 19,900$), 242 ($\epsilon = 20,000$).
IR (CHCl$_3$ $\nu_{max} = 1675$ cm$^{-1}$.

EXAMPLE 19

Androsta-5,17(20)-dien-3β-ol-20-carboxaldehyde

17α-ethynyl-17β-hyhroxy-androst-5-en-3β-ol (0.163 g.) was refluxed in xylene (5 ml.) with 50 mg. of tris(triphenyl-siloxy)vanadium oxide, 10 mg. of triphenylsilanol, and a few crystals of benzoic acid for 3 hours. The solution was poured into 10 ml. of hexane and filtered. The filtrate was concentrated and the residue chromatographed on activity III alumina to afford 85.6 mg. of semi-solid aldehyde.

Nmr $\delta_{CDCl_3}^{TMS}$ 9.84 ppm (doublet, aldehyde portons), 1.05 and 0.88 (angular methyls).

The same amount of catalyst, silanol, benzoic acid and solvent used in Example 19 were utilized in Examples 20–22.

Using the same quantities of catalyst, silanol, benzoic acid and solvent, the following transformations were effected:

EXAMPLE 20

74.3 mg. of 1,3,5(10)-estratriene-17α-ethynyl-3, 17β-diol-3-benzoate gave 59.6 mg. of the 1,3,5(10), 17(20)-estratetren-3-ol-20-carboxaldehyde-3-benzoate.

Nmr $\delta_{CDCl_3}^{TMS}$ 9.85 and 10.1 ppm (doublets, two isomeric aldehydes).

EXAMPLE 21

230.9 mg. of racemic norgestrel gave 270.0 mg. of racemic 18-homoestra-4,17(20)-dien-3-one-20-carboxaldehyde.

Nmr $\delta_{CDCl_3}^{TMS}$ 9.75 and 9.93 ppm (doublets, two isomeric aldehydes).

EXAMPLE 22

130.1 mg. of norethynodrel gave 30.5 mg. of estra-5(10),17(20)-dien-3-one-20-carboxaldehyde after chromatography.

Nmr $\delta_{CDCl_3}^{TMS}$ 9.92 and 10.02 ppm (doublets, two isomeric aldehydes).

EXAMPLE 23

Vanadium pentoxide (18.2 g.), triphenylsilanol (165.8 g.), 1-butanol (50 g.) and xylene were boiled for 24 hours and the water formed was distilled out. The solution was fitered and tris-(triphenyl-siloxy) vanadium oxide (126,9 g.) crystallized from the filtrate.

EXAMPLE 24

Tris-(tricyclohexyl-siloxy)vanadium oxide (5.3 g.), tricyclohexysilanol (10.6 g.) stearic acid (0.5 g.) and mineral oil (400 ml.) were heated at 160°C. with dehydrolinalool (15 g.) for 2.5 hours. Citral was distilled out in 73% yield and the process was repeated over 80 times by adding dehydrolinalool to the residue after each distillation.

EXAMPLE 25

In an analogous manner to that described in Example 19 and using the same quantities of catalyst, silanol, benzoic acid and solvent 3-keto-19-ethylidene-17α-ethynyl-17β-hydroxy-androst-1,4,6-triene gave 3-keto-19-ethylidene-pregna-1,4,6,17(20)-tetraen-21-al.

NMR $\delta_{CDCl_3}^{TMS}$ 0.98 and 1.18 ppm (18-CH$_3$), UV: $\epsilon_{241} = 26100$, $\epsilon_{292} = 9780$. IR: 1673, 1660 cm$^{-1}$ (—CHO); 1609, 1590 cm$^{-1}$ (conjugated double bonds).

EXAMPLE 26

A mixture of 20 g of 2-hydroxy-2-methyl-3-butynal dimethylacetal, 6 g of triphenyl silanol, 150 ml of paraffin oil and 0.6 ml of tris-(triphenylsiloxy)-vanadium oxide are heated at 155°C for 3 hours with stirring. After cooling the reaction product was recovered by distillation under reduced pressure. A further distillation of the distillate under reduced pressure yields 15 g of pure (E)-2-methyl-2-butenedial-1-(dimethylacetal), boiling point (0.1–0.2 mm): 41°–42°C, a colourless liquid.

We claim:

1. A catalyst system consisting essentially of a mixture of a vanadate catalyst of the formula:

$$[(R_4)_3Si-O]_m-V=O$$
$$|$$
$$[OR]_n$$

wherein $R_4$ is lower alkyl, higher alkyl, cycloalkyl, aryl or aryl lower alkyl, said cycloalkyl or aryl is unsubstituted or substituted with lower alkyl, R is $R_4$ or $(R_4)_3Si-$; $m$ is an integer of from 1 to 3; and $n$ is an integer of 0 to 2, with the proviso that the sum of $m$ and $n$ is 3; and at least 0.05 mole percent, based upon the moles of said siloxy vanadium oxide of a silanol of the formula:

$$(R_5)_3-SiOH$$

wherein $R_5$ is lower alkyl, higher alkyl, cycloalkyl, aryl or aryl lower alkyl where the cycloalkyl or the aryl is unsubstituted or substituted with lower alkyl.

2. The system of claim 1 wherein said silanol is present in an amount of from 0.05 to 85,000 mole percent, based upon the moles of said siloxy vanadium oxide.

3. The system of claim 1 wherein said vanadate has the formula:

$$[(R_4)_3-SiO]_3-O$$

4. The system of claim 3 wherein said vanadate is tri-(triphenyl-siloxy)-vanadium oxide.

* * * * *

UNITED STATES PATENT AND TRADEMARK OFFICE
CERTIFICATE OF CORRECTION

PATENT NO. : 3,912,656
DATED : October 14, 1975
INVENTOR(S) : David Arthur Andrews and Nathan Chadwick Hindley It is certified that error appears in the above–identified patent and that said Letters Patent are hereby corrected as shown below:

Column 18, line 16, Claim 3

"$[(R_4)_3\text{-SiO}]_3\text{---O}$"

should be $[(R_4)_3\text{-SiO}]_3\text{-V=O}$

[SEAL]

Signed and Sealed this

Eighteenth Day of October 1977

Attest:

RUTH C. MASON
*Attesting Officer*

LUTRELLE F. PARKER
*Acting Commissioner of Patents and Trademarks*